US012476604B2

(12) United States Patent
Popescu et al.

(10) Patent No.: US 12,476,604 B2
(45) Date of Patent: Nov. 18, 2025

(54) NOISE FILTER DESIGN FOR IMBALANCED CURRENTS IN DOWNHOLE APPLICATIONS

(71) Applicant: Halliburton Energy Services, Inc., Houston, TX (US)

(72) Inventors: Lucian Popescu, Houston, TX (US); Faisal Shah, Houston, TX (US); Thong Minh Nguyen, Houston, TX (US); Brian A Roberson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 135 days.

(21) Appl. No.: 18/099,766

(22) Filed: Jan. 20, 2023

(65) Prior Publication Data

US 2024/0250655 A1 Jul. 25, 2024

(51) Int. Cl.
*H01F 27/24* (2006.01)
*H01F 27/28* (2006.01)
*H03H 7/01* (2006.01)

(52) U.S. Cl.
CPC .......... *H03H 7/0138* (2013.01); *H01F 27/24* (2013.01); *H01F 27/28* (2013.01)

(58) Field of Classification Search
None
See application file for complete search history.

(56) References Cited

U.S. PATENT DOCUMENTS

| 6,917,271 | B2 | 7/2005 | Zhang et al. | |
|---|---|---|---|---|
| 10,294,727 | B2 | 5/2019 | Nguyen | |
| 10,330,717 | B2 | 6/2019 | Popescu et al. | |
| 11,255,187 | B1 | 2/2022 | Chen et al. | |
| 2015/0270057 | A1* | 9/2015 | Lestician | H01F 27/2823 323/361 |
| 2016/0273340 | A1 | 9/2016 | Roberson et al. | |
| 2017/0315263 | A1 | 11/2017 | Griffing et al. | |
| 2019/0049614 | A1* | 2/2019 | Griffing | E21B 47/12 |
| 2020/0043642 | A1* | 2/2020 | Wunsch | H01F 17/062 |
| 2020/0232893 | A1 | 7/2020 | Nguyen et al. | |
| 2021/0278562 | A1 | 9/2021 | Wu et al. | |
| 2022/0367102 | A1* | 11/2022 | Liu | H01F 17/062 |

* cited by examiner

*Primary Examiner* — Rexford N Barnie
*Assistant Examiner* — Aqeel H Bukhari
(74) *Attorney, Agent, or Firm* — Benjamin Ford; C. Tumey Law Group PLLC

(57) ABSTRACT

An electromagnetic interference (EMI) filter disposed in a downhole tool. The EMI filter may include at least one common mode choke. The at least one common mode choke may include a high permeability magnetic core and three coils wound around the high permeability magnetic core. The three coils may include an input and an output. The EMI filter may further include a power supply connected to two coils of the three coils and a common ground connected to a third coil of the three coils.

20 Claims, 7 Drawing Sheets

NOISE FILTER DESIGN FOR IMBALANCED CURRENTS IN DOWNHOLE APPLICATIONS

BACKGROUND

Wellbores drilled into subterranean formations may enable recovery of desirable fluids (e.g., hydrocarbons) using any number of different techniques. Currently, drilling operations may identify subterranean formations through a bottom hole assembly if the subterranean formation is disposed horizontal to the bottom hole assembly. Measurement operations performed by downhole logging tools may identify properties within a wellbore and/or inside a formation. Utilization of electronics in downhole logging tool for measurement operations and bottom hole assemblies for drilling operations has increased the complexity of electronics over time.

Besides batteries, electrical circuits including AC power generators, AC-DC and DC-AC converters are supplying electric power to information handling systems, communication equipment, sensory equipment, motor controls, and/or the like. Additionally, silicon carbide-based power conversion technologies allow for faster switching processes at higher ambient temperatures, reducing the switching losses, permitting higher switching frequencies, and enabling smaller power supply component size.

However, increased switching speed and processing power generate a higher amount of electrical noise which disturbs and interferes with the functionality of sensitive electrical equipment disposed around electrical components. To mitigate this challenge, electromagnetic interference (EMI) filters are inserted between converters and electronic equipment to prevent propagation of conducted noise. The designing of effective EMI filters has become increasingly challenging due to the complexity of the power architecture being used, with multiple voltage rails being generated with a shared return path for current, which may form imbalanced currents.

BRIEF DESCRIPTION OF THE DRAWINGS

The features and advantages of certain embodiments will be more readily appreciated when considered in conjunction with the accompanying figures. The figures are not to be construed as limiting any of the preferred embodiments.

DETAILED DESCRIPTION

The present disclosure relates to electronics utilized in drilling equipment for drilling operations as well as logging equipment utilizing in measurement operations. As the complexity of electronics increases, imbalanced currents may increase electrical noise, which may interfere with the functionality of sensitive electrical equipment. These situations may be found when a power converter supplies a high-voltage/high-power and a low-voltage/low-power output. To design an effective electrical noise filtering solution, among other passive components, common mode chokes (CMCs) may be utilized. CMCs are specialized inductors, employing a very high permeability magnetic core material and very efficient at filtering the common mode electrical noise. However, when utilizing a CMC, differential current within the CMC must be balanced, meaning that at any given time, the sum of the current flowing through the CMC in one direction must be zero. If this is not the case, the CMC high permeability magnetic core may saturate, rendering the electromagnetic interference (EMI) filter ineffective. EMI filters are commonly used throughout the electronics industry. EMI filters are typically placed on input power lines of electronic equipment so that high frequency electromagnetic noise does not enter or escape the equipment. It is desirable for EMI filters to attenuate high frequency noise as much as possible. Typically, noise that must be attenuated is in the frequency range of about 10 kilohertz or 150 kilohertz to 30 megahertz. Noise in the frequency range of about 1-30 MHz is particularly problematic because it can propagate across a circuit board via inductive coupling. An ineffective EMI filter may allow for electrical noise to hinder drilling operations and measurement operations.

Figure 1:
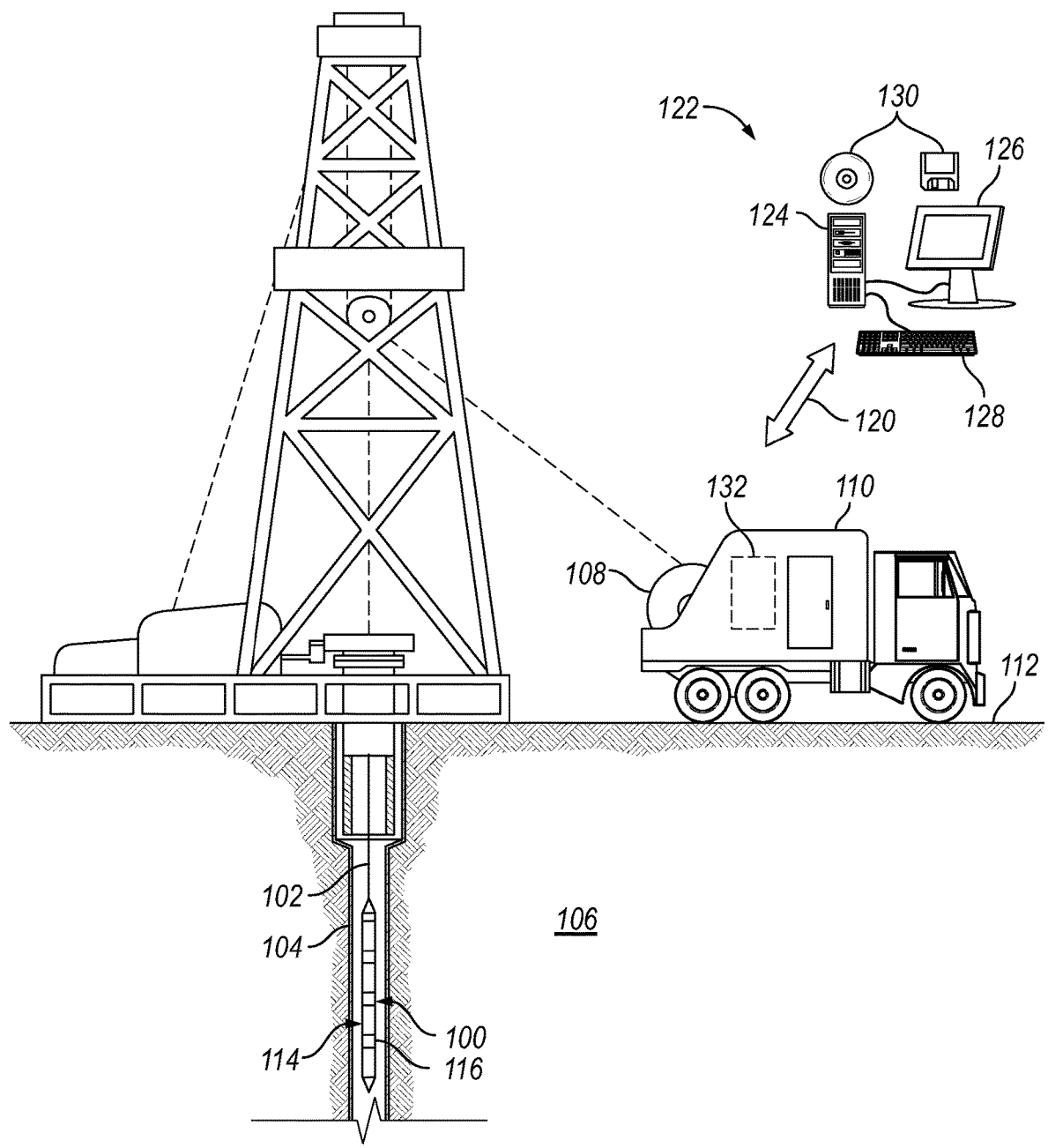
FIG. 1 illustrates a schematic view of a well in which an example embodiment of a measurement tool in a measurement operation.

FIG. 1 is a schematic diagram of downhole tool 100 on a conveyance 102. As illustrated, wellbore 104 may extend through subterranean formation 106. In examples, reservoir fluid may be contaminated with well fluid (e.g., drilling fluid) from wellbore 104. As described herein, downhole tool 100 may be any device that comprises electronic circuitry to perform a downhole operation. Downhole operations may comprise fluid analysis, resistivity measurements, cement evaluation, casing evaluation, formation evaluation, mud permittivity, ranging operations, and/or the like. As illustrated, a wellbore 104 may extend through subterranean formation 106. While the wellbore 104 is shown extending generally vertically into the subterranean formation 106, the principles described herein are also applicable to wellbores that extend at an angle through the subterranean formation 106, such as horizontal and slanted wellbores. For example, although FIG. 1 shows a vertical or low inclination angle well, high inclination angle or horizontal placement of the well and equipment is also possible. It should further be noted that while FIG. 1 generally depicts a land-based operation, those skilled in the art will readily recognize that the principles described herein are equally applicable to subsea operations that employ floating or sea-based platforms and rigs, without departing from the scope of the disclosure.

As illustrated, a hoist 108 may be used to run downhole tool 100 into wellbore 104. Hoist 108 may be disposed on a vehicle 110. Hoist 108 may be used, for example, to raise and lower conveyance 102 in wellbore 104. While hoist 108 is shown on vehicle 110, it should be understood that conveyance 102 may alternatively be disposed from a hoist 108 that is installed at surface 112 instead of being located on vehicle 110. Downhole tool 100 may be suspended in wellbore 104 on conveyance 102. Other conveyance types may be used for conveying downhole tool 100 into wellbore 104, including coiled tubing and wired drill pipe, for example. Downhole tool 100 may comprise a tool body 114, which may be elongated as shown on FIG. 1. Tool body 114 may be any suitable material, including without limitation titanium, stainless steel, alloys, plastic, combinations thereof, and the like. Downhole tool 100 may further comprise one or more sensors 116 for measuring properties of the fluid sample, reservoir fluid, wellbore 104, subterranean formation 106, and/or the like.

In examples, downhole tool 100 may comprise at least one sensor for any type of downhole measurement. Such sensors comprise optical sensors, acoustic sensors, electromagnetic sensors, conductivity sensors, resistivity sensors, selective electrodes, density sensors, mass sensors, thermal sensors, chromatography sensors, viscosity sensors, bubble point sensors, fluid compressibility sensors, flow rate sensors, pressure sensors, nuclear magnetic resonance (NMR) sensors. In examples, sensors may measure a contrast between drilling fluid filtrate properties and formation fluid properties, derive properties and characterize fluid, measure absorption, transmittance, reflectance spectra and translate such measurements into component concentrations of the fluid sample, gas-to-oil ratio, fluid composition, water cut, live fluid density, live fluid viscosity, formation pressure, and formation temperature and fluid composition.

Measurements taken by one or more sensors on downhole tool 100 may be processed on any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. The absorption, transmittance, or reflectance spectra absorption, transmittance, or reflectance spectra may be measured with sensors 116 by way of standard operations. For example, downhole tool 100 may comprise random access memory (RAM), one or more processing units, such as a central processing unit (CPU), or hardware or software control logic, ROM, and/or other types of nonvolatile memory. Downhole tool 100 may be communicatively coupled via communication link 120 with information handling system 122.

Any suitable technique may be used for transmitting signals from downhole tool 100 to the surface 112. As illustrated, a communication link 120 (which may be wired or wireless, for example) may be provided that may transmit data from downhole tool 100 to an information handling system 122 at surface 112. Information handling system 122 may comprise a processing unit 124, a monitor 126, an input device 128 (e.g., keyboard, mouse, etc.), and/or computer media 130 (e.g., optical disks, magnetic disks) that can store code representative of the methods described herein. Information handling system 122 may act as a data acquisition system and possibly a data processing system that analyzes information from downhole tool 100. For example, information handling system 122 may process the information from downhole tool 100 for determination of fluid contamination. The information handling system 122 may also determine additional properties of the fluid sample (or reservoir fluid), such as component concentrations, pressure-volume-temperature properties (e.g., bubble point, phase envelop prediction, etc.) based on the fluid characterization. This processing may occur at surface 112 in real-time. Alternatively, the processing may occur downhole hole or at surface 112 or another location after recovery of downhole tool 100 from wellbore 104. Alternatively, the processing may be performed by an information handling system disposed on downhole tool 100 and disposed in wellbore 104. Measurements may then be transmitted to surface 112, for example, in real-time.

Figure 2:
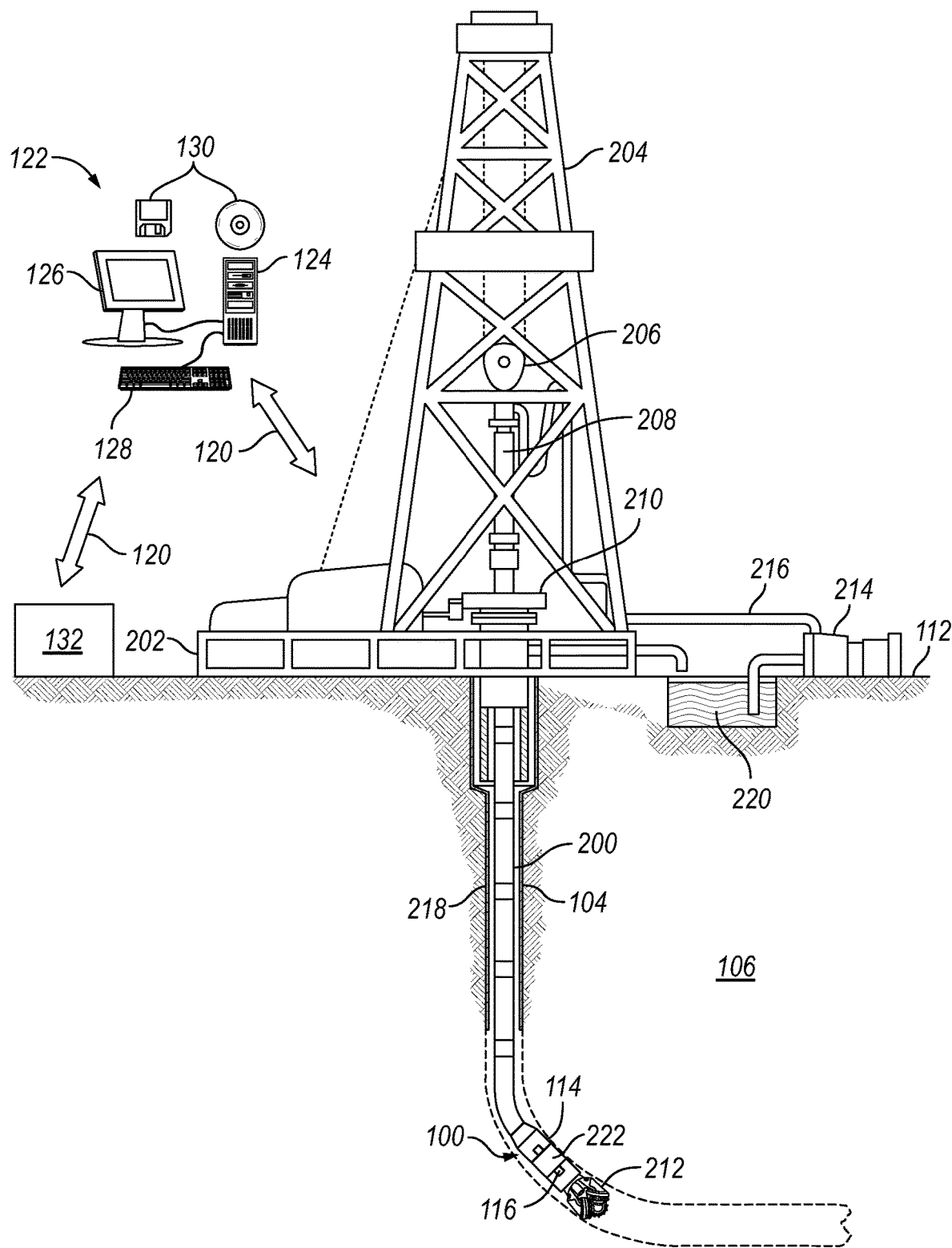
FIG. 2 illustrates a schematic view of another well in which a measurement tool is utilized in a drilling operation.

Referring now to FIG. 2, a schematic diagram of downhole tool 100 disposed on a drill string 200 in a drilling operation. As discussed above, downhole tool 100 may comprise one or more sensors 116 that may operate and function as described above. Additionally, downhole tool 100 may further comprise an information handling system 122, which may be utilized to guide drilling operations through sensors 116 and/or other devices used to steer downhole tool 100 through subterranean formation 106 to form a wellbore.

As illustrated, a wellbore 104 may extend through subterranean formation 106. While the wellbore 104 is shown extending generally vertically into the subterranean formation 106, the principles described herein are also applicable to wellbores that extend at an angle through the subterranean formation 106, such as horizontal and slanted wellbores. For example, although FIG. 2 shows a vertical or low inclination angle well, high inclination angle or horizontal placement of the well and equipment is also possible. It should further be noted that while FIG. 2 generally depicts a land-based operation, those skilled in the art will readily recognize that the principles described herein are equally applicable to subsea operations that employ floating or sea-based platforms and rigs, without departing from the scope of the disclosure.

As illustrated, a drilling platform 202 may support a derrick 204 having a traveling block 206 for raising and lowering drill string 200. Drill string 200 may comprise, but is not limited to, drill pipe and coiled tubing, as generally known to those skilled in the art. A kelly 208 may support drill string 200 as it may be lowered through a rotary table 210. A drill bit 212 may be attached to the distal end of drill string 200 and may be driven either by a downhole motor and/or via rotation of drill string 200 from the surface 112. Without limitation, drill bit 212 may comprise roller cone bits, PDC bits, natural diamond bits, any hole openers, reamers, coring bits, and the like. As drill bit 212 rotates, it may create and extend wellbore 104 that penetrates various subterranean formations 106. A pump 214 may circulate drilling fluid through a feed pipe 216 to kelly 208, downhole through interior of drill string 200, through orifices in drill bit 212, back to surface 112 via annulus 218 surrounding drill string 200, and into a retention pit 220.

Drill bit 212 may be just one piece of a downhole assembly that may comprise one or more drill collars 222 and downhole tool 100. Downhole tool 100, which may be built into drill collars 222 may gather measurements and fluid samples as described herein. One or more of the drill collars 222 may form a tool body 114, which may be elongated as shown on FIG. 2. Tool body 114 may be any suitable material, including without limitation titanium, stainless steel, alloys, plastic, combinations thereof, and the like. Downhole tool 100 may be similar in configuration and operation to downhole tool 100 shown on FIG. 1 except that FIG. 2 shows downhole tool 100 disposed on drill string 200. Alternatively, downhole tool 100 may be lowered into the wellbore after drilling operations on a wireline.

As previously described, information from downhole tool 100 may be transmitted to an information handling system 122, which may be located at surface 112. As illustrated, communication link 120 (which may be wired or wireless, for example) may be provided that may transmit data from downhole tool 100 to an information handling system 122 at surface 112. Information handling system 122 may comprise a processing unit 124, a monitor 126, an input device 128 (e.g., keyboard, mouse, etc.), and/or computer media 130 (e.g., optical disks, magnetic disks) that may store code representative of the methods described herein. In addition to, or in place of processing at surface 112, processing may occur downhole (e.g., fluid analysis module 118). In examples, information handling system 122 may perform computations to estimate asphaltenes within a fluid sample.

Figure 3:
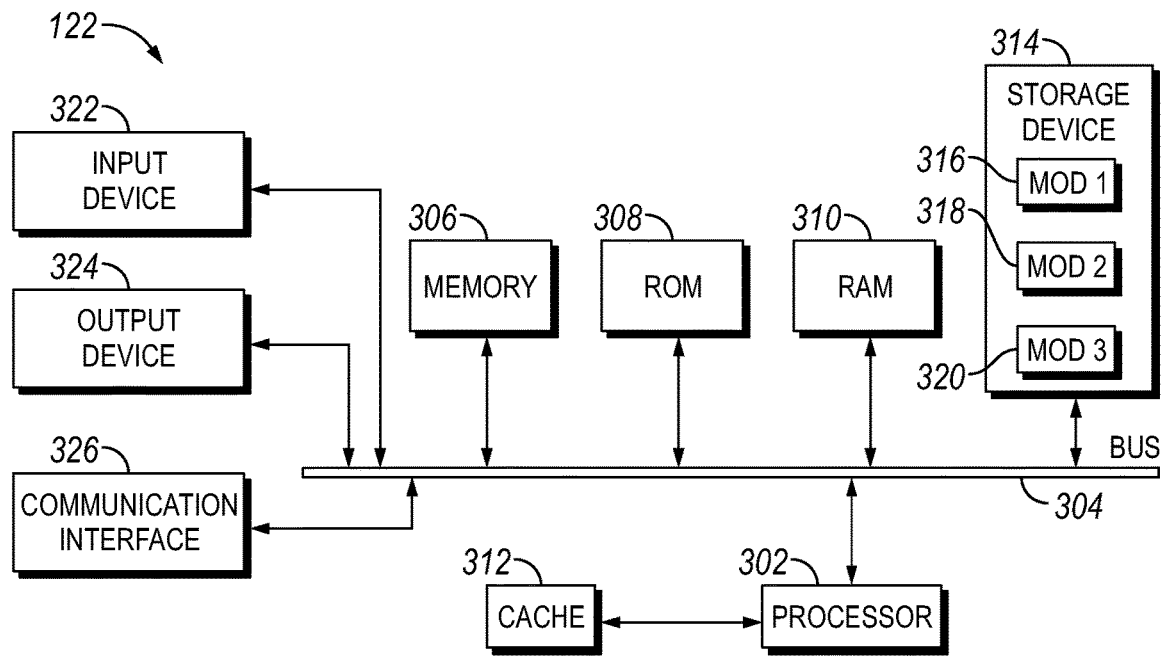
FIG. 3 illustrates a schematic view of a chipset in an information handling system.

FIG. 3 illustrates an example information handling system 122 which may be employed to perform various steps, methods, and techniques disclosed herein. Persons of ordinary skill in the art will readily appreciate that other system examples are possible. As illustrated, information handling system 122 comprises a processing unit (CPU or processor) 302 and a system bus 304 that couples various system components including system memory 306 such as read only memory (ROM) 308 and random-access memory (RAM) 310 to processor 302. Processors disclosed herein may all be forms of this processor 302. Information handling system 122 may comprise a cache 312 of high-speed memory connected directly with, in close proximity to, or integrated as part of processor 302. Information handling system 122 copies data from memory 306 and/or storage device 314 to cache 312 for quick access by processor 302. In this way, cache 312 provides a performance boost that avoids processor 302 delays while waiting for data. These and other modules may control or be configured to control processor 302 to perform various operations or actions. Other system memory 306 may be available for use as well. Memory 306 may comprise multiple different types of memory with different performance characteristics. It may be appreciated that the disclosure may operate on information handling system 122 with more than one processor 302 or on a group or cluster of computing devices networked together to provide greater processing capability. Processor 302 may comprise any general-purpose processor and a hardware module or software module, such as first module 316, second module 318, and third module 320 stored in storage device 314, configured to control processor 302 as well as a special-purpose processor where software instructions are incorporated into processor 302. Processor 302 may be a self-contained computing system, containing multiple cores or processors, a bus, memory controller, cache, etc. A multi-core processor may be symmetric or asymmetric. Processor 302 may comprise multiple processors, such as a system having multiple, physically separate processors in different sockets, or a system having multiple processor cores on a single physical chip. Similarly, processor 302 may comprise multiple distributed processors located in multiple separate computing devices but working together such as via a communications network. Multiple processors or processor cores may share resources such as memory 306 or cache 312 or may operate using independent resources. Processor 302 may comprise one or more state machines, an application specific integrated circuit (ASIC), or a programmable gate array (PGA) including a field PGA (FPGA).

Each individual component discussed above may be coupled to system bus 304, which may connect each and every individual component to each other. System bus 304 may be any of several types of bus structures including a memory bus or memory controller, a peripheral bus, and a local bus using any of a variety of bus architectures. A basic input/output (BIOS) stored in ROM 308 or the like, may provide the basic routine that helps to transfer information between elements within information handling system 122, such as during start-up. Information handling system 122 further comprises storage devices 314 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 314 may comprise software modules 316, 318, and 320 for controlling processor 302. Information handling system 122 may comprise other hardware or software modules. Storage device 314 is connected to the system bus 304 by a drive interface. The drives and the associated computer-readable storage devices provide non-volatile storage of computer-readable instructions, data structures, program modules and other data for information handling system 122. In one aspect, a hardware module that performs a particular function comprises the software component stored in a tangible computer-readable storage device in connection with the necessary hardware components, such as processor 302, system bus 304, and so forth, to carry out a particular function. In another aspect, the system may use a processor and computer-readable storage device to store instructions which, when executed by the processor, cause the processor to perform operations, a method or other specific actions. The basic components and appropriate variations may be modified depending on the type of device, such as whether information handling system 122 is a small, handheld computing device, a desktop computer, or a computer server. When processor 302 executes instructions to perform "operations", processor 302 may perform the operations directly and/or facilitate, direct, or cooperate with another device or component to perform the operations.

As illustrated, information handling system 122 employs storage device 314, which may be a hard disk or other types of computer-readable storage devices which may store data that are accessible by a computer, such as magnetic cassettes, flash memory cards, digital versatile disks (DVDs), cartridges, random access memories (RAMs) 310, read only memory (ROM) 308, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with information handling system 122, an input device 322 represents any number of input mechanisms, such as a microphone for speech, a touch-sensitive screen for gesture or graphical input, keyboard, mouse, motion input, speech and so forth. Additionally, input device 322 may take in data from one or more sensors 136, discussed above. An output device 324 may also be one or more of a number of output mechanisms known to those of skill in the art. In some instances, multimodal systems enable a user to provide multiple types of input to communicate with information handling system 122. Communications interface 326 generally governs and manages the user input and system output. There is no restriction on operating on any particular hardware arrangement and therefore the basic hardware depicted may easily be substituted for improved hardware or firmware arrangements as they are developed.

As illustrated, each individual component described above is depicted and disclosed as individual functional blocks. The functions these blocks represent may be provided through the use of either shared or dedicated hardware, including, but not limited to, hardware capable of executing software and hardware, such as a processor 302, that is purpose-built to operate as an equivalent to software executing on a general-purpose processor. For example, the functions of one or more processors presented in FIG. 3 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) 308 for storing software performing the operations described below, and random-access memory (RAM) 310 for storing results. Very large-scale integration (VLSI) hardware embodiments, as well as custom VLSI circuitry in combination with a general-purpose DSP circuit, may also be provided.

The logical operations of the various methods, described below, are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. Information handling system 122 may practice all or part of the recited methods, may be a part of the recited systems, and/or may operate according to instructions in the recited tangible computer-readable storage devices. Such logical operations may be implemented as modules configured to control processor 302 to perform particular functions according to the programming of software modules 316, 318, and 320.

In examples, one or more parts of the example information handling system 122, up to and including the entire information handling system 122, may be virtualized. For example, a virtual processor may be a software object that executes according to a particular instruction set, even when a physical processor of the same type as the virtual processor is unavailable. A virtualization layer or a virtual "host" may enable virtualized components of one or more different computing devices or device types by translating virtualized operations to actual operations. Ultimately however, virtualized hardware of every type is implemented or executed by some underlying physical hardware. Thus, a virtualization computer layer may operate on top of a physical computer layer. The virtualization computer layer may comprise one or more virtual machines, an overlay network, a hypervisor, virtual switching, and any other virtualization application.

Figure 4:
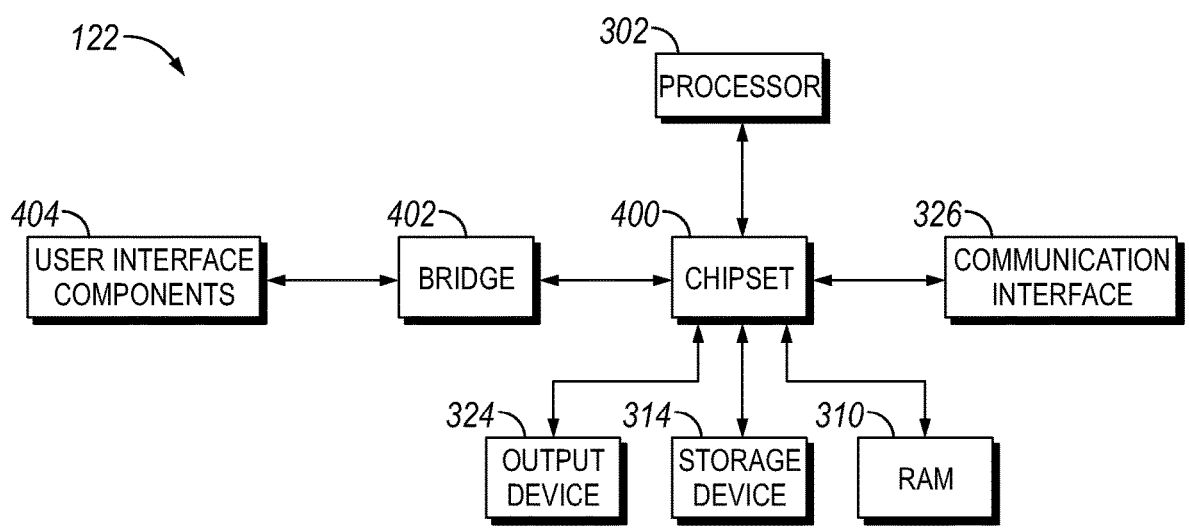
FIG. 4 illustrates the chipset in communication with other components of the information handling system.

FIG. 4 illustrates an example information handling system 122 having a chipset architecture that may be used in executing the described method and generating and displaying a graphical user interface (GUI). Information handling system 122 is an example of computer hardware, software, and firmware that may be used to implement the disclosed technology. Information handling system 122 may comprise a processor 302, representative of any number of physically and/or logically distinct resources capable of executing software, firmware, and hardware configured to perform identified computations. Processor 302 may communicate with a chipset 400 that may control input to and output from processor 302. In this example, chipset 400 outputs information to output device 324, such as a display, and may read and write information to storage device 314, which may comprise, for example, magnetic media, and solid-state media. Chipset 400 may also read data from and write data to RAM 310. A bridge 402 for interfacing with a variety of user interface components 404 may be provided for interfacing with chipset 400. User interface components 404 may comprise a keyboard, a microphone, touch detection and processing circuitry, a pointing device, such as a mouse, and so on. In general, inputs to information handling system 122 may come from any of a variety of sources, machine generated and/or human generated.

Chipset 400 may also interface with one or more communication interfaces 326 that may have different physical interfaces. Such communication interfaces may comprise interfaces for wired and wireless local area networks, for broadband wireless networks, as well as personal area networks. Some applications of the methods for generating, displaying, and using the GUI disclosed herein may comprise receiving ordered datasets over the physical interface or be generated by the machine itself by processor 302 analyzing data stored in storage device 314 or RAM 310. Further, information handling system 122 receives inputs from a user via user interface components 404 and executes appropriate functions, such as browsing functions by interpreting these inputs using processor 302.

In examples, information handling system 122 may also comprise tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may comprise RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be comprised within the scope of the computer-readable storage devices.

Computer-executable instructions comprise, for example, instructions and data which cause a general-purpose computer, special purpose computer, or special purpose processing device to perform a certain function or group of functions. Computer-executable instructions also comprise program modules that are executed by computers in stand-alone or network environments. Generally, program modules comprise routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

FIGS. 1-4 illustrate and discuss a small fraction of the electronic complexity that may be found in drilling operation and/or measurement operations. As noted above, electromagnetic interference (EMI) filters may be inserted into electronic equipment to prevent propagation of conducted noise. For examples, EMI filters may be disposed in electronic equipment that make up sensor 116 (e.g., referring to FIG. 1 or 2), electronic equipment connected to sensors 116, electronic equipment disposed in and makes up information handling system 122 (e.g., referring to FIGS. 1-3), and/or any part of chipset 400 (e.g., referring to FIG. 4). Discussed below is the systems and methods of an EMI filter disposed in downhole tool 100 (e.g., referring to FIG. 1) and utilized to allow electronics to perform measurement and drilling operations described above. The designing of effective EMI filters has become increasingly challenging due to the complexity of the power architecture being used, with multiple voltage rails being generated with a shared return path for current, which may form imbalanced currents.

Multiple output power supplies may have a common ground. Ideally, separate outputs may be organized as a pair of wires with a common ground internally connected at a single point. However, in complex electronic architecture, mechanical or electrical limitations force the return ground path to be shared among a combination of wires or as a single common, larger gauge wire. In such instances, designing an effective EMI filter solution to prevent electric noise generated inside the power supply from spreading to other sensitive circuits within an electronic architecture is challenging. This is because CMC components placed on individual output pair of wires may easily saturate when current is increasing. As current increases, noise also increases. An EMI filter circuit design is discussed below to prevent common mode inductor saturation in complex power system architectures containing multiple voltage rails for which in-and-out current paths are not clearly defined. Specifically, a common mode inductor design of the EMI filter circuit is discussed in detail.

Figure 5:
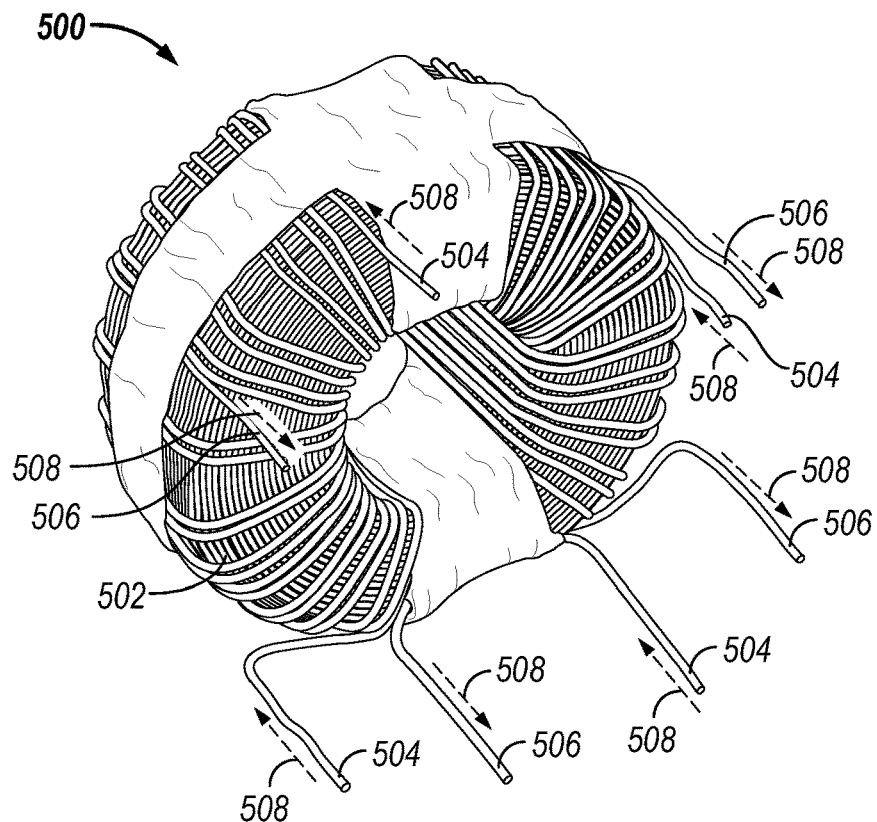
FIG. 5 illustrates a common mode choke (CMC)

FIG. 5 illustrates a common mode choke (CMC) 500 designed to prevent saturation of high permeability magnetic core 502 that is a component of CMC 500. High permeability magnetic materials are generally considered as having a relative permeability $\rho_R$>1,000. In examples, saturation of high permeability magnetic core 502 may occur when direct current (DC) or low frequency variable electric current flow is not well controlled, which may result in an imbalanced current. For this disclosure, imbalanced current in a CMC 500 is defined as electric current flowing in one direction of CMC 500 that is not identical with the electric current flowing in the opposite direction through CMC 500. A balanced current is when the electric current flowing in one direction of CMC 500 is identical to the electric current flowing in the opposite direction through CMC 500. As illustrated, CMC 500 may comprise three or more coils wound around high permeability magnetic core 502, where each coil has an input 504 and an output 506 in which current flow 508 may pass through CMC 500, which is part of an EMI filter circuit, discussed below. In embodiments, there may be four coils, five coils, six coils, seven coils, eight coils, nine coils, ten coils, or more wound around high permeability magnetic core 502. As discussed below, at least one coil may be utilized to supply high voltage, low voltage, or a mixture of both. Additionally, at least one coil may be utilized as a common ground, a high voltage return, a low voltage return, or a mixture of both. Using the fundamental rule that in a CMC 500 the sum of current flow 508 flowing in one direction must cancel by the sum of current flow 508 flowing in the opposite direction. The construction of CMC 500 incorporates the collection of all coils and high permeability magnetic core 502 into a single magnetic structure. This may allow the total DC or low frequency variable current to be zero, which may prevent saturation of high permeability magnetic core 502.

Figure 6:
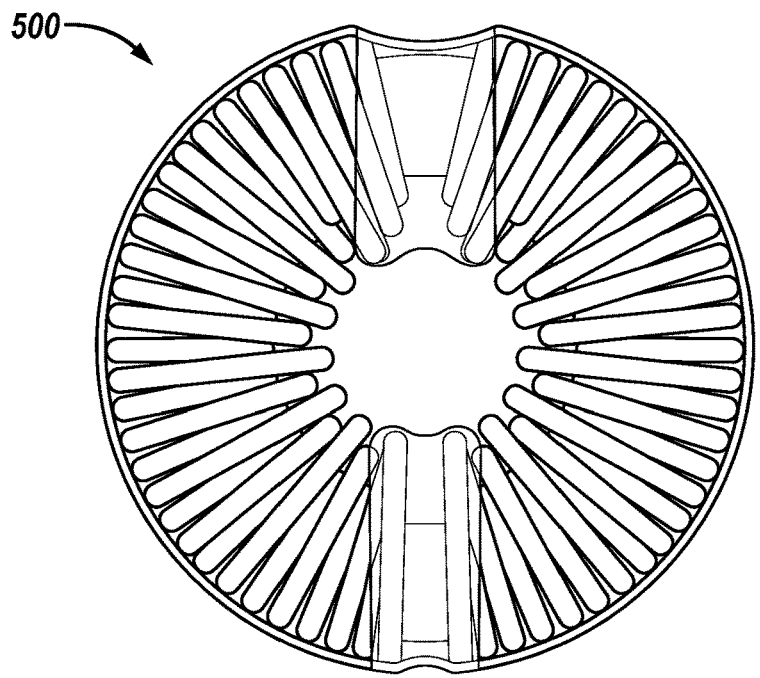
FIG. 6 is a top view of the CMC.
Figure 7:
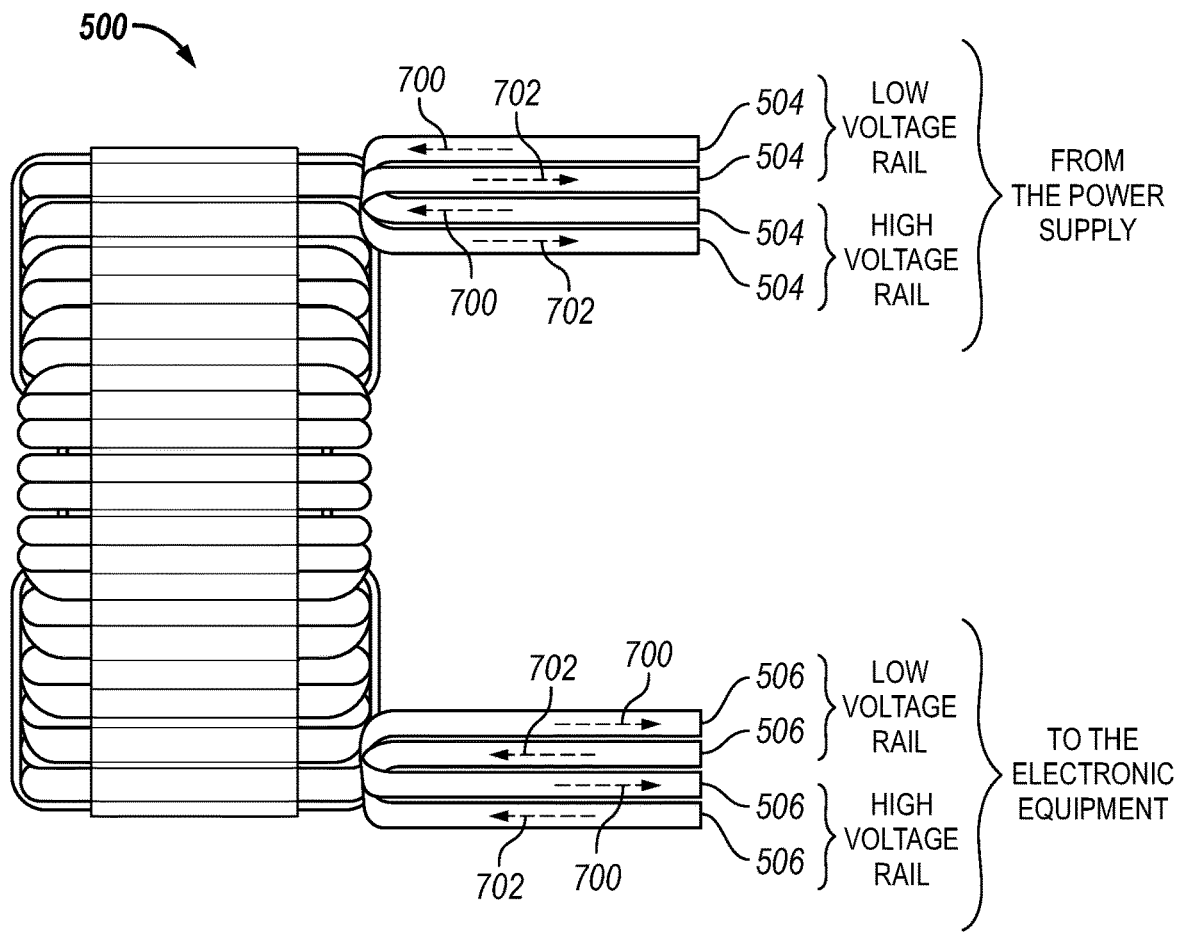
FIG. 7 is a side view of the CMC.

FIG. 6 illustrates a top view of CMC 500 and FIG. 7 illustrates a side view of CMC 500. Additionally, FIG. 7 illustrates a plurality of coils, each with an input 504 and an output 506 with a current flow 508 in a designed direction. Both FIGS. 6 and 7 show a practical implementation of utilizing CMC 500 that may be used in an EMI filter circuit preventing electrical noise generated by a power supply circuit, to further propagate and interfere with sensitive electronic equipment. For the example illustrated in FIGS. 6 and 7, there are four coils with an input 504 and an output 506 that may connect a power supply circuit (not illustrated) to electronic equipment. Each of these coils may be designed for a specific direction in which current may flow from the power supply to the electronic equipment or vice versa. As noted above, CMC 500 may experience a DC current or low frequency variable currents flowing through the coils as imbalanced currents. Under this implementation, there are two coils supplying electric power as two regulated, high voltage and low voltage rails, with supply current flow 700 from the power supply to electronic equipment, and two coils carrying return current flow 702 from the electronic equipment into the power supply. However, the high voltage and low voltage power rails carrying return current flow 702 may be shared among two coils or a single coil. In examples, high voltage may range at 60 VDC and above while low voltage may range below 60 VDC.

Figure 8:
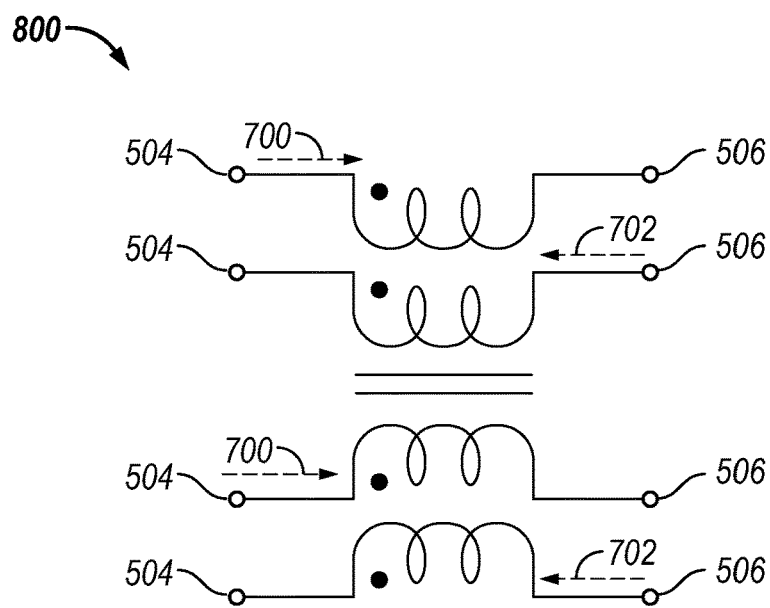
FIG. 8 is an electrical symbol utilized for the CMC.
Figure 9:
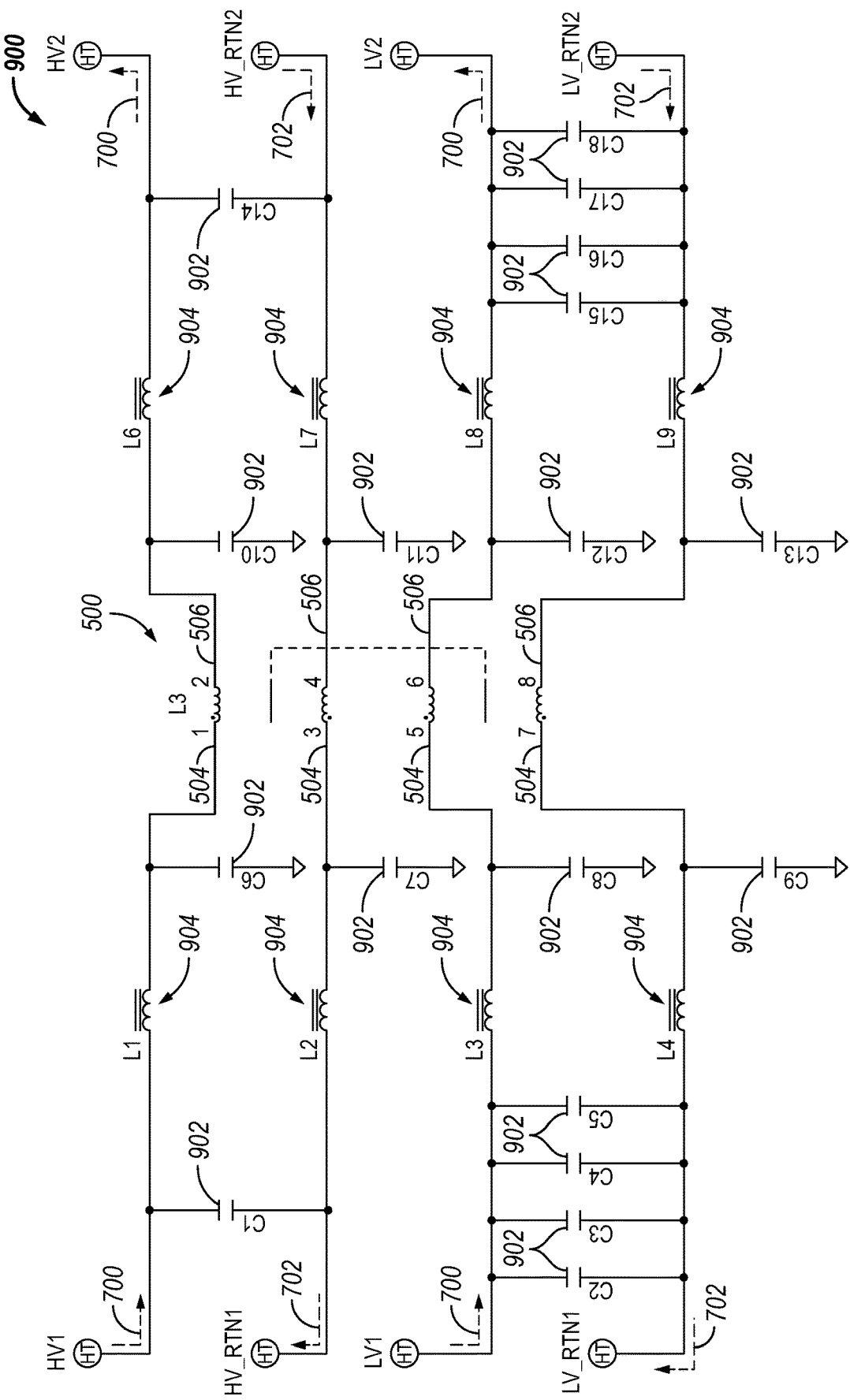
FIG. 9 is a schematic example of an electromagnetic interference (EMI) filter circuit.

FIG. 8 illustrates an electrical symbol 800 of CMC 500 from FIGS. 5-7. As illustrated, electrical symbol 800 shows a design of CMC 500 that may be implemented in an electromagnetic interference (EMI) filter circuit, shown in FIGS. 9 and 10. FIG. 9 illustrates an example of an electromagnetic interference (EMI) filter circuit 900 with a collection of capacitors 902 and inductors 904, that together with CMC 500 serve the purpose of preventing the electrical noise generated by the power supply circuit to penetrate the electronic equipment and negatively interfere with sensitive circuits. Under this EMI filter circuit 900 implementation, the power supply, generating electrical noise, may have supply current flow 700 flowing from the power supply circuit into the electronic equipment via High Voltage (HV) 1→HV2 path and some of the return current may return into the power supply via Low Voltage Return (LV_RTN) 2→LV_RTN1 path as a fraction of return current flow 702. Likewise, some current flowing from the power supply circuit as supply current flow 700 into the electronic equipment via Low Voltage (LV)1→LV2 path may return into the power supply via High Voltage Return (HV_RTN) 2→HV_RTN1 path as a fraction of return current flow 702. The implementation of EMI filter circuit 900 with CMC 500, illustrated in FIG. 9, may prevent high permeability magnetic core 502 from saturating and prevent the degradation of the noise filtering characteristics of EMI filter circuit 900.

Figure 10:
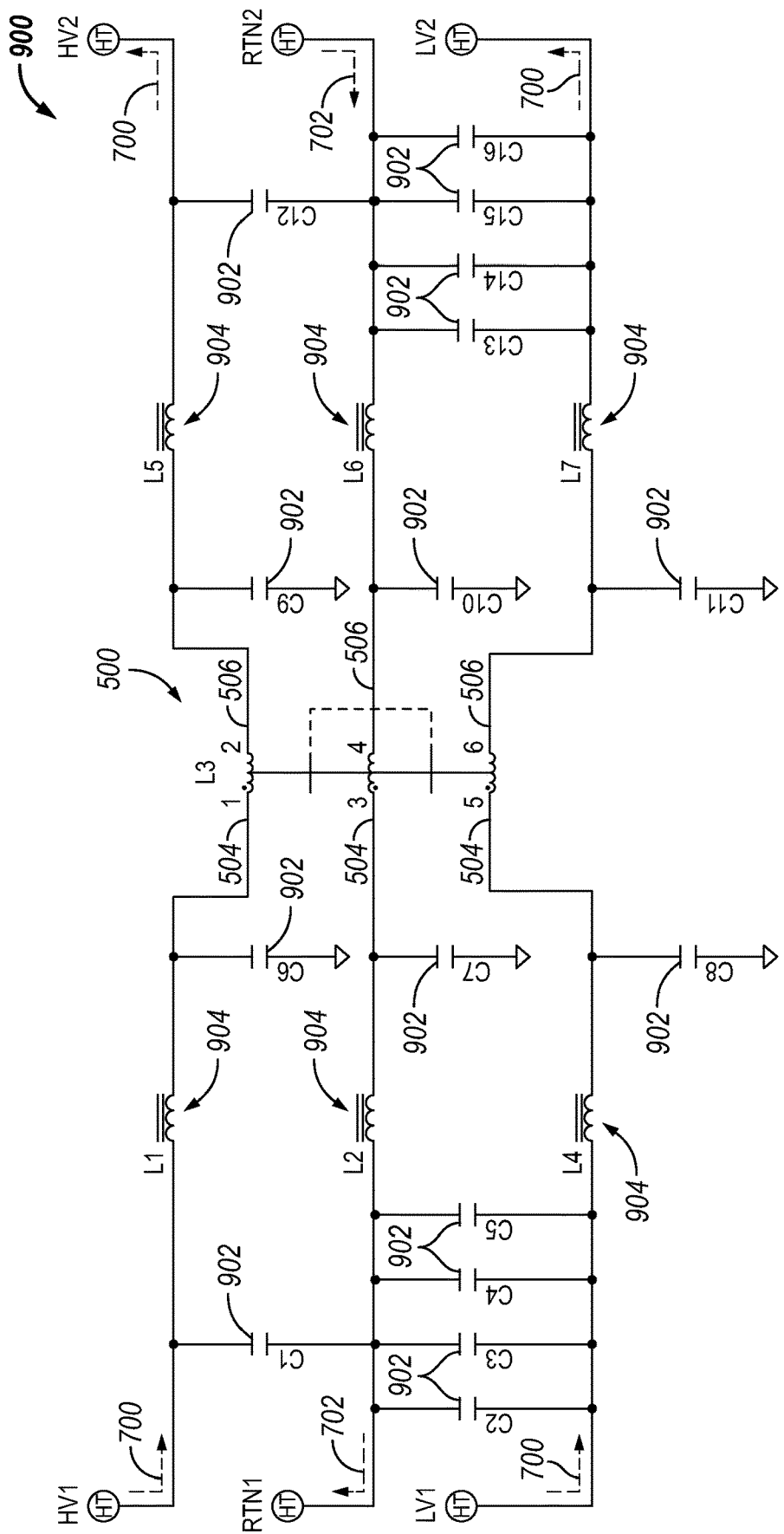
FIG. 10 is another schematic example of an EMI filter circuit.

FIG. 10 illustrates another example of an electromagnetic interference (EMI) filter circuit 900 with a collection of capacitors 902 and inductors 904, that together with CMC 500 serve the purpose of preventing electrical noise generated by a power supply circuit to penetrate the electronic equipment and negatively interfere with sensitive circuits. Under this EMI filter circuit 900 implementation, the power supply generating electrical noise may have supply current flow 700 flowing from power supply circuit into the electronic equipment via High Voltage (HV)1→HV2 path. Additionally, supply current flow 700 may flow from the power supply circuit into the electronic equipment via Low Voltage (LV)1→LV2. As illustrated in FIG. 10, return current flow 702 may return both HV and LV to the power supply via RTN2→RTN1 in a common path as a common ground. The implementation of EMI filter circuit 900 with CMC 500, illustrated in FIG. 10, may prevent high permeability magnetic core 502 from saturating and prevent the degradation of the noise filtering characteristics of EMI filter circuit 900.

There may be any number of alternative implementations of EMI filter circuit 900 with CMC 500 where one or more wires may provide a shared return current path or two or more outputs of a power supply. EMI filter circuit 900 and the schematics discussed above are examples of possible combinations of electronic parts. There may be any number of electronic architectures that utilize CMC 500 with imbalanced current to prevent electrical noise.

The methods and systems described above are an improvement over existing CMC technology that would be ineffective if DC or low frequency variable currents flowing through multiple outputs and their respective returns in complex power supplies become imbalanced. Current technology recognizes the negative effects that potential imbalanced crosscurrents among parallel or multiple outputs power supplies could have on common mode chokes. Solutions in the current art to address this negative effect comprise designing an apparatus including crosscurrents detectors, resulting in feedback control signals causing the parallel power supplies to either switch in an interleaved or synchronous way with the purpose to cancel the said crosscurrents.

Accordingly, this disclosure describes apparatus and methods that may relate to reducing and/or preventing electrical noise in an electronic architecture. The apparatus, methods, and compositions may further be characterized by one or more of the following statements:

Statement 1: An electromagnetic interference (EMI) filter disposed in a downhole tool. The EMI filter may include at least one common mode choke. The at least one common mode choke may include a high permeability magnetic core and three coils wound around the high permeability magnetic core. The three coils may include an input and an output. The EMI filter may further include a power supply connected to two coils of the three coils and a common ground connected to a third coil of the three coils.

Statement 2: The electromagnetic interference filter of statement 1, wherein the power supply applies a high voltage to a first coil of the two coils.

Statement 3: The electromagnetic interference filter of statement 2, wherein the power supply applies a low voltage to a second coil of the two coils.

Statement 4: The electromagnetic interference filter of statement 3, wherein the three coils create a balanced current.

Statement 5: The electromagnetic interference filter of any previous statements 1 or 2, wherein the two coils connect the power supply to a sensitive electronic circuit.

Statement 6: The electromagnetic interference filter of any previous statements 1, 2, or 5 wherein the EMI filter is disposed in a downhole tool.

Statement 7: The electromagnetic interference filter of statement 6, wherein the downhole tool is utilized in a measurement operation.

Statement 8: The electromagnetic interference filter of statement 6, wherein the downhole tool is utilized in a drilling operation.

Statement 9: A system may comprise a downhole tool and an electromagnetic interference (EMI) filter disposed within the downhole tool. The EMI filter may comprise at least one common mode choke. The at least one common mode choke may comprise a high permeability magnetic core and three coils wound around the high permeability magnetic core, wherein each of the three coils includes an input and an output. The system may further comprise a power supply connected to two coils of the three coils and a common ground connected to a third coil of the three coils.

Statement 10: The system of statement 9, wherein the power supply applies a high voltage to a first coil of the two coils.

Statement 11: The system of statement 10, wherein the power supply applies a low voltage to a second coil of the two coils.

Statement 12: The system of statement 11, wherein the three coils create a balanced current.

Statement 13: The system of any previous claim 9 or 10, wherein the two coils connect the power supply to a sensitive electronic circuit.

Statement 14: The system of any previous claim 9, 10, or 13, wherein the downhole tool is utilized in a measurement operation.

Statement 15: The system of any previous statements 9, 10, 13, or 14, wherein the downhole tool is utilized in a drilling operation.

Statement 16: A method may comprise disposing a downhole tool into a wellbore, wherein an electromagnetic interference (EMI) filter is disposed within the downhole tool. The EMI filter may comprise at least one common mode choke. The at least one common mode choke may comprise a high permeability magnetic core and three coils wound around the high permeability magnetic core, wherein each of the three coils includes an input and an output. The method may further comprise applying a high voltage to a first coil of the three coils, applying a low voltage to a second coil of the three coils, and creating a return current through a third coil of the three coils.

Statement 17: The method of claim 16, wherein the three coils create a balanced current.

Statement 18: The method of any previous statements 16 or 17, wherein the first coil and the second coil connect a power supply to a sensitive electronic circuit.

Statement 19: The method of any previous statements 16-18, wherein the downhole tool is utilized in a measurement operation.

Statement 20. The method of any previous statements 16-19, wherein the downhole tool is utilized in a drilling operation.

The preceding description provides various embodiments of the systems and methods of use disclosed herein which may contain different method steps and alternative combinations of components. It should be understood that, although individual embodiments may be discussed herein, the present disclosure covers all combinations of the disclosed embodiments, including, without limitation, the different component combinations, method step combinations, and properties of the system. It should be understood that the compositions and methods are described in terms of "including," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any comprised range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. An electromagnetic interference (EMI) filter comprising:
    at least one common mode choke comprising:
        a high permeability magnetic core; and
        three coils wound around the high permeability magnetic core, wherein at least one coil of the three coils is configured to supply a mixture of high and low voltages, and wherein each coil of the three coils:
            includes a current input and a current output; and
            is associated with a direction of current flow;
    a power supply connected to two coils of the three coils; and
    a common ground connected to a third coil of the three coils.

2. The electromagnetic interference filter of claim 1, wherein the power supply applies a high voltage to a first coil of the two coils.

3. The electromagnetic interference filter of claim 2, wherein the power supply applies a low voltage to a second coil of the two coils.

4. The electromagnetic interference filter of claim 3, wherein the three coils create a balanced current.

5. The electromagnetic interference filter of claim 1, wherein the two coils connect the power supply to a sensitive electronic circuit.

6. The electromagnetic interference filter of claim 1, wherein the EMI filter is disposed in a downhole tool.

7. The electromagnetic interference filter of claim 6, wherein the downhole tool is utilized in a measurement operation.

8. The electromagnetic interference filter of claim 6, wherein the downhole tool is utilized in a drilling operation.

9. A system comprising:
    a downhole tool; and
    an electromagnetic interference (EMI) filter disposed within the downhole tool, wherein the EMI filter comprises:
        at least one common mode choke comprising:
            a high permeability magnetic core; and
            three coils wound around the high permeability magnetic core, wherein at least one of the coils of the three coils is configured to supply a mixture of high and low voltages, and wherein each coil of the three coils;
                includes a current input and a current output; and
                is associated with a direction of current flow;
        a power supply connected to two coils of the three coils; and
        a common ground connected to a third coil of the three coils.

10. The system of claim 9, wherein the power supply applies a high voltage to a first coil of the two coils.

11. The system of claim 10, wherein the power supply applies a low voltage to a second coil of the two coils.

12. The system of claim 11, wherein the three coils create a balanced current.

13. The system of claim 9, wherein the two coils connect the power supply to a sensitive electronic circuit.

14. The system of claim 9, wherein the downhole tool is utilized in a drilling operation.

15. The system of claim 9, wherein the downhole tool is utilized in a measurement operation.

16. A method comprising:
    disposing a downhole tool into a wellbore, wherein an electromagnetic interference (EMI) filter is disposed within the downhole tool, and wherein the EMI filter comprises:
        at least one common mode choke comprising:
            a high permeability magnetic core; and
            three coils wound around the high permeability magnetic core, wherein at least one coil of the three coils is configured to supply a mixture of high and low voltages, and wherein each coil of the three coils:
                includes a current input and a current output; and
                is associated with a direction of current flow; and
        a power supply connected to two coils of the three coils;
    directing a high voltage to the current input and the current output of a first coil of the three coils;
    directing a low voltage to the current input and the current output of a second coil of the three coils; and
    creating a return current through the current input and the current output of a third coil of the three coils.

17. The method of claim 16, wherein the three coils create a balanced current.

18. The method of claim 16, wherein the first coil and the second coil connect a power supply to a sensitive electronic circuit.

19. The method of claim 16, wherein the downhole tool is utilized in a measurement operation.

20. The method of claim 16, wherein the downhole tool is utilized in a drilling operation.

* * * * *